(12) United States Patent
Tanaami et al.

(10) Patent No.: US 12,409,934 B2
(45) Date of Patent: Sep. 9, 2025

(54) PICKUP SYSTEM AND PICKUP METHOD

(71) Applicant: SINTOKOGIO, LTD., Nagoya (JP)

(72) Inventors: Yoshikane Tanaami, Nagoya (JP); Koji Ito, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 345 days.

(21) Appl. No.: 17/767,200

(22) PCT Filed: Oct. 11, 2021

(86) PCT No.: PCT/JP2021/037505
§ 371 (c)(1),
(2) Date: Apr. 7, 2022

(87) PCT Pub. No.: WO2022/080289
PCT Pub. Date: Apr. 21, 2022

(65) Prior Publication Data
US 2023/0182901 A1 Jun. 15, 2023

(30) Foreign Application Priority Data
Oct. 16, 2020 (JP) .................................. 2020-174933

(51) Int. Cl.
*B64D 9/00* (2006.01)
*B64D 1/22* (2006.01)
(Continued)

(52) U.S. Cl.
CPC ................ *B64D 9/00* (2013.01); *B64D 1/22* (2013.01); *B64F 1/36* (2013.01); *B64U 80/00* (2023.01);
(Continued)

(58) Field of Classification Search
CPC ..... B64D 9/00; B64D 1/22; B64F 1/36; B64F 1/32; B64U 80/00; B64U 2101/60; B64U 10/14; B64U 2101/66; B66C 1/10
See application file for complete search history.

(56) References Cited

U.S. PATENT DOCUMENTS 10,207,794 B1 * 2/2019 Beckman ................ B64U 40/20
2002/0144967 A1 * 10/2002 Jacoff ..................... B66C 13/08
212/274
(Continued)

FOREIGN PATENT DOCUMENTS

CN 205819554 U 12/2016
JP 2018-127217 A 8/2018
(Continued)

OTHER PUBLICATIONS

Gantry System you tube : https://youtu.be/bYSyob0xLMc?si=kVd-FjIVrPg_NMD—(Year: 2018).*
(Continued)

*Primary Examiner* — Hunter B Lonsberry
*Assistant Examiner* — Jalal C Coduroglu
(74) *Attorney, Agent, or Firm* — Harness, Dickey & Pierce, P.L.C.

(57) ABSTRACT

An aspect of the present invention provides a pickup system which makes, even in a case of transporting a load by using a single unmanned flying object, the unmanned flying object and the load less likely to tilt. A pickup system (1) includes: a holder (11) for holding a load (L); a measuring instrument (14) for measuring the position of the center of gravity of the holder (11) holding the load (L); and a controller (15) for moving, to a position immediately above the position of the center of gravity of the holder (11) holding the load (L), a (Continued)

connector (12) which is attached to the holder (11) in a movable manner and which is for connecting the holder (11) to a drone (D).

7 Claims, 5 Drawing Sheets

(51) Int. Cl.
  *B64F 1/36*   (2024.01)
  *B64U 10/14*  (2023.01)
  *B64U 80/00*  (2023.01)
  *B64U 101/60* (2023.01)
  *B64U 101/64* (2023.01)

(52) U.S. Cl.
  CPC .......... *B64U 10/14* (2023.01); *B64U 2101/60* (2023.01); *B64U 2101/64* (2023.01)

(56) References Cited

U.S. PATENT DOCUMENTS

| | | | | |
|---|---|---|---|---|
| 2003/0140713 | A1* | 7/2003 | Ohsato | G01L 5/162 73/862.041 |
| 2004/0238240 | A1* | 12/2004 | Hirose | B62D 57/032 180/8.1 |
| 2006/0106495 | A1* | 5/2006 | Takenaka | B62D 57/032 700/253 |
| 2007/0059247 | A1* | 3/2007 | Lindner | A61K 49/223 424/9.52 |
| 2007/0170140 | A1* | 7/2007 | Gaunekar | B23Q 1/012 212/312 |
| 2016/0304325 | A1* | 10/2016 | Esteban Fink | B66C 1/10 |
| 2017/0029104 | A1 | 2/2017 | Kim | |
| 2017/0129749 | A1* | 5/2017 | Rodríguez Mijangos | B66C 13/08 |
| 2020/0030981 | A1* | 1/2020 | Kamiya | B25J 9/1674 |
| 2020/0148349 | A1* | 5/2020 | Bosworth | B64U 10/16 |
| 2020/0355571 | A1* | 11/2020 | Priest | G08G 5/55 |
| 2021/0053216 | A1* | 2/2021 | Diankov | B25J 9/1669 |
| 2021/0114728 | A1* | 4/2021 | Murakami | B25J 13/00 |
| 2023/0182901 | A1* | 6/2023 | Tanaami | B64F 1/36 701/3 |

FOREIGN PATENT DOCUMENTS

| | | |
|---|---|---|
| JP | 2018-203056 A | 12/2018 |
| JP | 2019-142441 A | 8/2019 |
| JP | 2020-157916 A | 10/2020 |
| JP | 2020-157922 A | 10/2020 |
| WO | 2018/003079 A1 | 1/2018 |

OTHER PUBLICATIONS

You tube : Module Linear Guide 3-Axis XYZ https://youtu.be/P8DDIWxNuuw?si=4ioqQ2xSG3UwLkFv (Year: 2019).*

You Tube : XYZ Gantry Demo, Applied Motion Products, Inc. https://youtu.be/4YZWsLwEOs4?si=1ccyJ3KPYjqlkxzP (Year: 2020).*

International Search Report and English translation thereof dated Nov. 9, 2021.

Chinese Office Action for Chinese Patent Application No. 202180006327.8 issued on Jul. 18, 2025 and English language translation thereof.

* cited by examiner

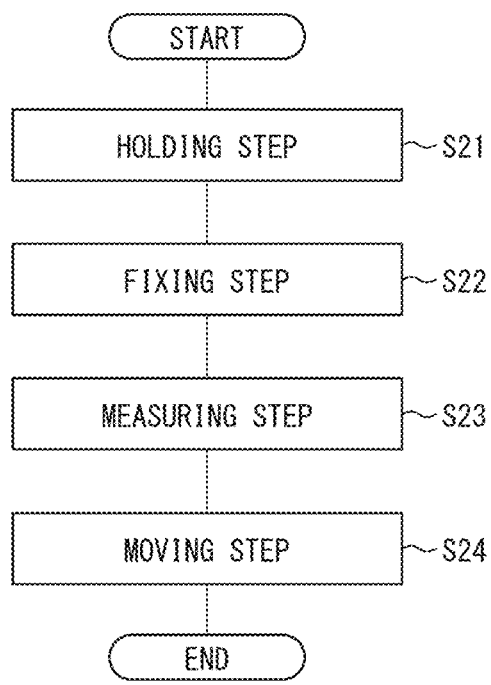

PICKUP SYSTEM AND PICKUP METHOD

TECHNICAL FIELD

The present invention relates to a pickup system and a pickup method, each of which is intended to cause an unmanned flying object to pick up a load.

BACKGROUND ART

Techniques for transporting a load using an unmanned flying object (a drone) have been recently put to practical use. Using an unmanned flying object enables both a reduction in transportation costs and an expansion of the reach of transportation.

In causing an unmanned flying object to pick up a load, it is important what part of the load is connected to the unmanned flying object. If the position of the part connected is inappropriate, the flying object could tilt due to the weight of the load (in a case where the flying object and the load are connected to each other in a fixed manner). This causes problems such as poorer fuel economy and difficulty in controlling a flight route. Alternatively, the load could tilt (in a case where the flying object and the load are connected to each other in an unfixed manner, for example, via a ball joint). This makes the load more likely to be damaged during transportation.

Literatures which disclose techniques for causing an unmanned flying object to pick up a load include, for example, Patent Literature 1. Patent Literature 1 discloses a technique according to which one cargo is transported by using a plurality of drones. The cargo has a plurality of eyebolts attached thereto. Meanwhile, each of the drones has a hook attached thereto. The hook is to be hooked into the eyebolt. In picking up the cargo by using the drones, a control device determines, in accordance with the weight of the cargo and the position of the center of gravity of the cargo, the number of drones to be used and eyebolts to be used among the plurality of eyebolts in order to lift the cargo.

CITATION LIST

Patent Literature

[Patent Literature 1]
Japanese Patent Application Publication Tokukai No. 2020-157922

SUMMARY OF INVENTION

Technical Problem

However, the technique disclosed in Patent Literature 1 is based on the premise that the cargo is picked up by using a plurality of drones. This causes problems of high introduction cost and high operation cost. In addition, in a case of using a drone having a high-capacity lift, it is possible to pick up a cargo by using a single drone. However, the cargo necessarily tilts during transportation since the eyebolts are attached to the cargo in the vicinity of an outer edge of the top plate of the cargo.

An aspect of the present invention has been made in view of the above problems. An object of an aspect of the present invention is to provide a pickup system and a pickup method each of which makes, even in a case of transporting a load by using a single unmanned flying object, the unmanned flying object and the load less likely to tilt.

Solution to Problem

A pickup system in accordance with an aspect of the present invention includes: a holder; a measuring instrument; and a controller. The holder is configured to hold a load. The measuring instrument is configured to measure a position of a center of gravity of the load or the holder holding the load. The controller is configured to move a connector to a position immediately above the position of the center of gravity, the connector being attached to the holder in a movable manner and being for connecting the holder to an unmanned flying object.

A pickup method in accordance with an aspect of the present invention includes: a holding step; a measuring step; and a moving step. The holding step is a step of holding a load by using a holder. The measuring step is a step of measuring, by using a measuring instrument, a position of a center of gravity of the load or the holder holding the load. The moving step is a step of moving, by using a controller, a movable connector to a position immediately above the position of the center of gravity, the movable connector being provided on the holder and being for connecting the holder to an unmanned flying object.

Advantageous Effects of Invention

An aspect of the present invention makes it possible to provide a pickup system and a pickup method each of which makes, even in a case of transporting a load by using a single unmanned flying object, the unmanned flying object and the load less likely to tilt.

BRIEF DESCRIPTION OF DRAWINGS

FIG. 6 is a flowchart illustrating a process flow of the pickup method in accordance with Embodiment 2 of the present invention.

DESCRIPTION OF EMBODIMENTS

Embodiment 1

Figure 1:
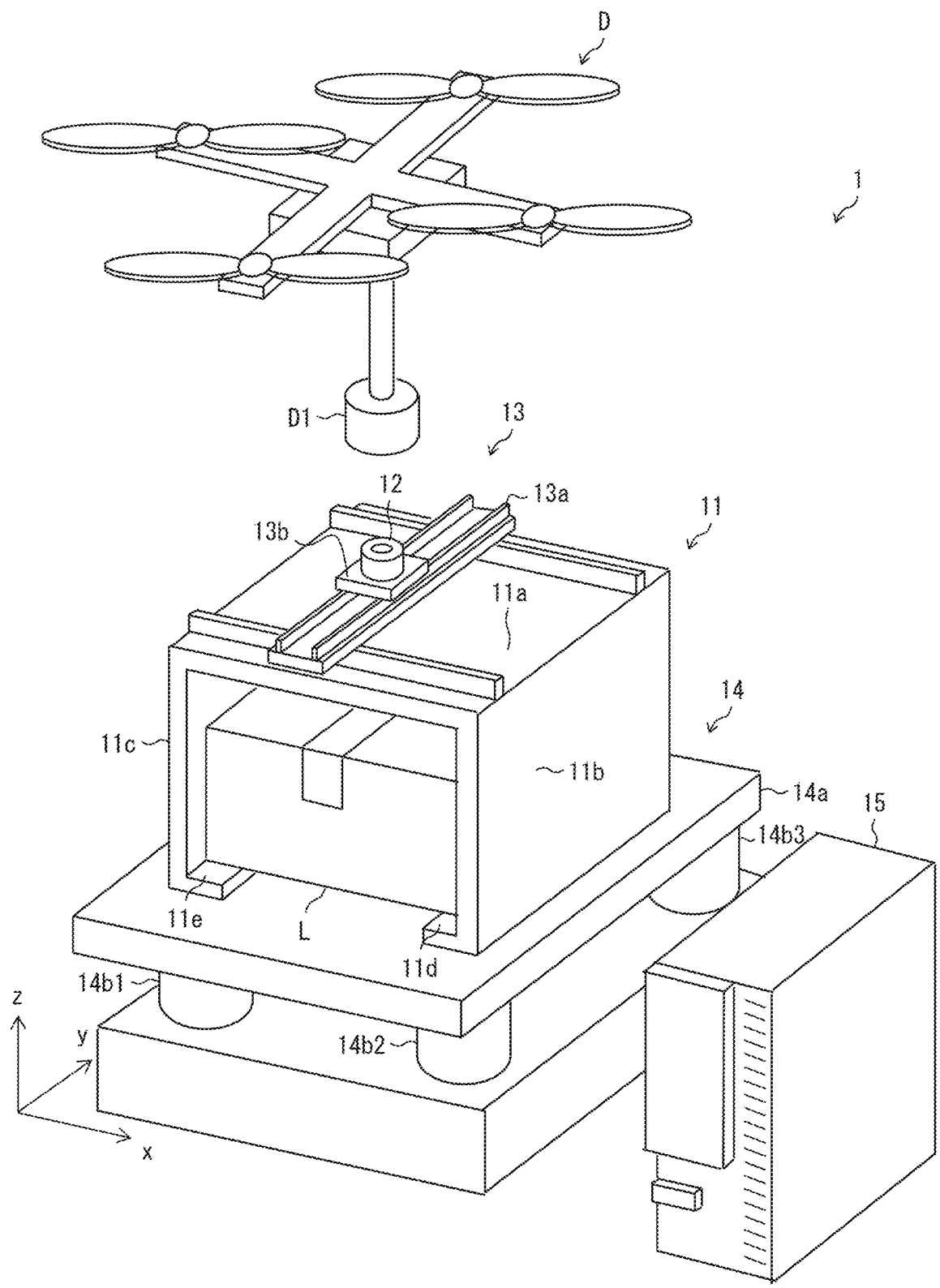
FIG. 1 is a perspective view illustrating a configuration of a pickup system in accordance with Embodiment 1 of the present invention.

(Configuration of Pickup System)
The following description will discuss a pickup system 1 in accordance with Embodiment 1 of the present invention with reference to FIG. 1. FIG. 1 is a perspective view of a configuration of the pickup system 1.

The pickup system 1 is a system for causing a drone D (an example of an "unmanned flying object" in the claims) to pick up a load L. As illustrated in FIG. 1, the pickup system 1 includes a holder 11, a connector 12, a moving mechanism 13, a measuring instrument 14, and a controller 15.

The holder 11 is configured to hold the load L. The present embodiment employs, as the holder 11, a holder composed of one top plate 11a and two side plates 11b and 11c, and two bottom plates 11d and 11e.

The top plate 11a, the two side plates 11b and 11c, and the two bottom plates 11d and 11e each have a rectangular shape when seen in plan view. In a coordinate system illustrated in FIG. 1, one side plate 11b of the two side plates 11b and 11c is joined to the top plate 11a such that an edge of the side plate 11b which is on a z-axis positive side of the side plate 11b and parallel to a y axis is joined to an edge of the top plate 11a which is on an x-axis positive side of the top plate 11a and parallel to the y axis. The other side plate 11c is joined to the top plate 11a such that an edge of the side plate 11c which is on the z-axis positive side of the side plate 11c and parallel to the y axis is joined to an edge of the top plate 11a which is on an x-axis negative side of the top plate 11a and parallel to the y axis. One bottom plate 11d of the bottom plates 11d and 11e is joined to the side plate 11b such that an edge of the bottom plate 11d which is on an x-axis positive side of the bottom plate 11d and parallel to the y axis is joined to an edge of the side plate 11b which is on a z-axis negative side of the side plate 11b and parallel to the y axis. The other bottom plate 11e is joined to the side plate 11c such that an edge of the bottom plate 11e which is on an x-axis negative side of the bottom plate 11e and parallel to the y axis is joined to an edge of the side plate 11c which is on a z-axis negative side of the side plate 11c and parallel to the y axis. The sum of the dimensions of the two bottom plates 11d and 11e in the x-axis direction is smaller than the dimension of the top plate 11a in the x-axis direction. In short, the holder 11 has a shape of a box which has a pair of open side surfaces that face each other and which also has a bottom that has a transverse open center part.

The load L is put in the holder 11 through the open side surfaces and/or the center part of the bottom. The two side plates 11b and 11c restrict movement of the load L in the x-axis positive direction and the x-axis negative direction. Meanwhile, the movement of the load L in the z-axis negative direction is restricted by the two bottom plates 11d and 11e. The holder 11 can optionally include a clip (not illustrated) attached thereto for restricting the movement of the load L in the y-axis positive direction, the y-axis negative direction, and the z-axis positive direction.

The connector 12 is configured to connect the holder 11 to the drone D. The moving mechanism 13 is configured to move the connector 12. The present embodiment employs, as the moving mechanism 13, a moving mechanism including a first slider 13a and a second slider 13b.

The first slider 13a is a slider which slides on the holder 11 in a first direction. According to the present embodiment, a pair of rails is provided on the top plate 11a of the holder 11 so as to extend parallel to the x axis. The first slider 13a is slidably attached to these rails. This allows the first slider 13a to slide on the holder 11 in the x-axis direction.

The second slider 13b is a slider which slides on the first slider 13a in a second direction intersecting the first direction. According to the present embodiment, a pair of rails is provided on the first slider 13a so as to extend parallel to the y axis. The second slider 13b is slidably attached to these rails. This allows the second slider 13b to slide on the first slider 13a in the y-axis direction.

According to the present embodiment, the connector 12 is fixed to the second slider 13b. As described above, the second slider 13b is capable of sliding on the first slider 13a in the second direction (the y-axis direction in the present embodiment), and the first slider 13a is capable of sliding on the holder 11 in the first direction (the x-axis direction in the present embodiment). This allows the connector 12 to freely move, on the holder 11, within a plane which contains axes in the first direction and the second direction (an x-y plane in the present embodiment).

The measuring instrument 14 is configured to measure the position of the center of gravity of the holder 11 holding the load L. The present embodiment employs a six-axis force sensor as the measuring instrument 14, although the measuring instrument 14 can be configured to carry out computation using a plurality of load cells. According to the present embodiment, the measuring instrument 14 includes: a plate 14a on which the holder 11 holding the load L is to be placed; and four six-axis force sensors 14b1 to 14b4 which are installed in a manner that supports the plate 14a. The six-axis force sensor refers to a sensor capable of detecting force Fx in the x-axis direction, force Fy in the y-axis direction, and force Fz in the z-axis direction, and moment Mx about the x axis, moment My about the y axis, and moment Mz about the z axis. The measuring instrument 14 provides, to the controller 15, sensor signals which are outputted from the four six-axis force sensors 14b1 to 14b4, respectively. In FIG. 1, the four six-axis force sensors 14b1 to 14b4 are installed on four corners of the plate 14a, respectively. The six-axis force sensor 14b4 is hidden behind the plate 14a and not illustrated in FIG. 1.

The controller 15 is configured to calculate, on the basis of the sensor signals obtained from the measuring instrument 14, the position of the center of gravity of the holder 11 holding the load L, and also to control the moving mechanism 13 so that the connector 12 is located immediately above the calculated position of the center of gravity. The present embodiment employs, as the controller 15, a computer which includes at least one processor and at least one memory. It is a known method to calculate, on the basis of the sensor signals outputted from the four six-axis force sensors 14b1 to 14b4, respectively, the position of the center of gravity of an object (the holder 11 holding the load L) placed on the plate 14a. Therefore, the description of the method is omitted.

It should be noted that a connector D1 of the drone D and the connector 12 of the holder 11 can be connected to each other either manually by an operator or automatically by the drone D. In the latter case, the controller 15 moves the connector 12 to a position immediately above the calculated position of the center of gravity, and then notify, of the position of the connector 12 thus moved, the drone D or a flight control device (not illustrated; the same applies below) for carrying out flight control of the drone D. This enables the drone D to automatically connect the connector D1 of the drone D and the connector 12 of the holder 11 to each other.

(Process Flow of Pickup Method)

Figure 2:
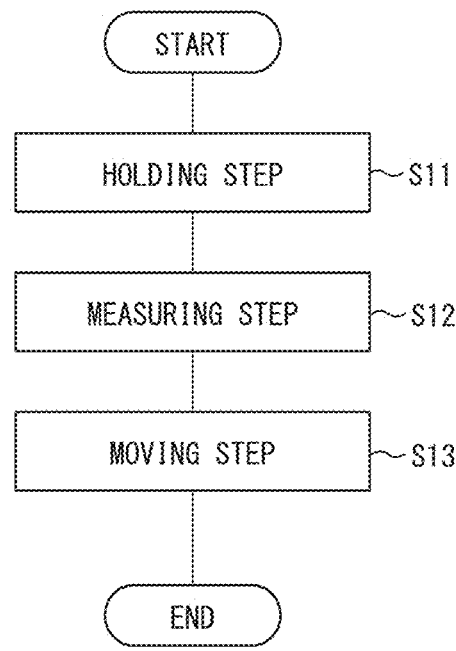
FIG. 2 is a flowchart illustrating a process flow of a pickup method in accordance with Embodiment 1 of the present invention.

The following description will discuss a pickup method S1 in accordance with Embodiment 1 of the present invention with reference to FIG. 2. FIG. 2 is a flowchart illustrating a process flow of the pickup method S1.

The pickup method S1 is a method for causing, by using the pickup system 1, the drone D to pick up the load L. As illustrated in FIG. 2, the pickup method S1 includes a holding step S11, a measuring step S12, and a moving step S13.

The holding step S11 is a step of holding the load L by using the above-described holder 11. The measuring step S12 is a step of measuring, by using the above-described measuring instrument 14, the position of the center of gravity of the holder 11 holding the load L. The moving step S13 is a step of moving, by using the above-described controller 15, the connector 12 which is provided on the holder 11 and which is for connecting the holder 11 to the drone D, to a position immediately above the position of the center of gravity of the holder 11 holding the load L.

It should be noted that the connector D1 of the drone D and the connector 12 of the holder 11 can be connected to each other either manually by an operator or automatically by the drone D. In the latter case, a notifying step can be additionally carried out after the moving step S13 is carried out. The notifying step is a step of notifying, of the position of the connector 12 moved, the drone D or the flight control device for carrying out flight control of the drone D. In the notifying step, the controller 15 is used to carry out notification. This allows the drone D to automatically connect the connector D1 of the drone D and the connector 12 of the holder 11 to each other.

(Effects of Pickup System and Pickup Method)

As above, the pickup system 1 in accordance with the present embodiment includes the holder 11 for holding the load L, the measuring instrument 14 for measuring the position of the center of gravity of the holder 11 holding the load L, and the controller 15 for moving, to a position immediately above the position of the center of gravity of the holder 11 holding the load L, the connector 12 which is attached to the holder 11 in a movable manner and which is for connecting the holder 11 to the drone D.

The pickup method S1 in accordance with the present embodiment includes: the holding step S11 of holding the load L by using the holder 11; the measuring step S12 of measuring, by using the measuring instrument 14, the position of the center of gravity of the holder 11 holding the load L; and the moving step S13 of moving, by using the controller 15, the connector 12 which is provided on the holder 11 and which is for connecting the holder 11 to the drone D, to a position immediately above the position of the center of gravity of the holder 11 holding the load L.

Thus, when the connector 12 of the holder 11 and the connector D1 of the drone D are connected to each other with use of the pickup system 1 or according to the pickup method S1, the position of the center of gravity of the holder 11 holding the load L comes to be located immediately below the connector D1 of the drone D. This makes it possible to effectively prevent the drone D and the load L from tilting. The drone D further includes a plurality of propellers (four propellers in the present embodiment). The pickup system 1 and the pickup method S1 can make respective drive outputs of the plurality of propellers equal to each other. This makes it possible to reduce a power consumption of the drone D. In other words, it is possible to increase the drive efficiency of the drone D.

According to the present embodiment, the measuring instrument 14 includes: the plate 14a on which the holder 11 holding the load L is to be placed; and at least one six-axis force sensor (e.g., six-axis force sensors 14b1 to 14b4) which is installed in a manner that supports the plate 14a.

This enables accurate measurement of the position of the center of gravity of the holder 11 holding the load L.

In particular, according to the present embodiment, the measuring instrument 14 includes: the plate 14a on which the holder 11 holding the load L is to be placed; and four six-axis force sensors 14b1 to 14b4 which are installed in a manner that supports the plate 14a.

This enables more accurate measurement of the position of the center of gravity of the holder 11 holding the load L.

According to the present embodiment, the pickup system 1 further includes the moving mechanism 13 for moving the connector 12. The moving mechanism 13 includes the first slider 13a which slides on the holder 11 in the first direction and the second slider 13b which slides on the first slider 13a in the second direction intersecting the first direction. The connector 12 is fixed to the second slider 13b.

This makes it possible to easily move the connector 12 to a position immediately above the position of the center of gravity of the holder 11 holding the load L.

According to the present embodiment, the controller 15 moves the connector 12 to the position immediately above the position of the center of gravity of the holder 11 holding the load L, and then notifies, of the position of the connector 12, the drone D or the flight control device for carrying out flight control of the drone D.

This makes it possible for the drone D to automatically connect the connector D1 of the drone D and the connector 12 of the holder 11 to each other.

It should be noted that although the present embodiment employs the configuration in which the position of the center of gravity of the holder 11 holding the load L is measured by using the measuring instrument 14, the present invention is not limited to this. An embodiment of the present invention can employ a configuration in which the position of the center of gravity of the load L is measured by using the measuring instrument 14. In this case, the controller 15 moves the connector 12 to a position immediately above the position of the center of gravity of the load L.

In a case where the weight of the holder 11 is sufficiently smaller than the weight of the load L, the position of the center of gravity of the load L substantially coincides with the position of the center of gravity of the holder 11 holding the load L. Accordingly, even in a case of employing the configuration in which the position of the center of gravity of the load L is measured, it is possible to achieve an effect which is substantially the same as that achieved in the case of employing the configuration in which the position of the center of gravity of the holder 11 holding the load L is measured.

(Software Implementation of Controller)

Some or all of the foregoing functions of the controller 15 can be implemented by hardware such as an integrated circuit (IC chip) or by software. In the latter case, the functions of the controller 15 are each implemented by, for example, a computer which executes instructions of a program P that is software.

Figure 3:
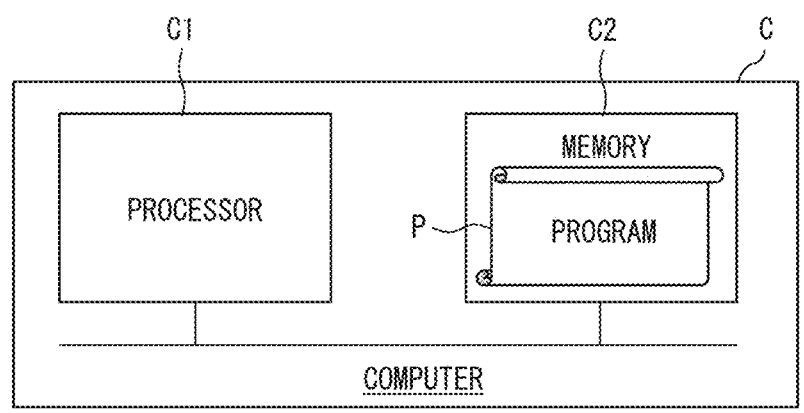
FIG. 3 is a block diagram illustrating a configuration of a computer which functions as a controller included in the pickup system in FIG. 1.

FIG. 3 illustrates an example of such a computer (hereinafter, referred to as computer C). As illustrated in FIG. 3, the computer C includes at least one processor C1 and at least one memory C2. The memory C2 stores a program P for causing the computer C to operate as the controller 15. In the computer C, the processor C1 reads the program P from the memory C2 and executes the program, so that the functions of the controller 15 are implemented.

Examples of the processor C1 encompass a central processing unit (CPU), a graphic processing unit (GPU), a digital signal processor (DSP), a micro processing unit (MPU), a floating point number processing unit (FPU), a physics processing unit (PU), a micro controller, and a combination thereof. Examples of the memory C2 encompass a flash memory, a hard disk drive (HDD), a solid state drive (SSD), and a combination thereof.

Note that the computer C can further include a random access memory (RAM), in which the program P is loaded when the program P is to be executed and in which various kinds of data are temporarily stored. The computer C can further include a communication interface through which data can be transmitted to and received from another device. The computer C can further include an input-output interface through which an input device such as a keyboard and a mouse and/or an output device such as a display and a printer is/are connected to the computer C.

The program P can be stored in a non-transitory, tangible storage medium M capable of being read by the computer C. Examples of such a storage medium M encompass a tape, a disk, a card, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

Embodiment 2

(Configuration of Pickup System)

Figure 4:
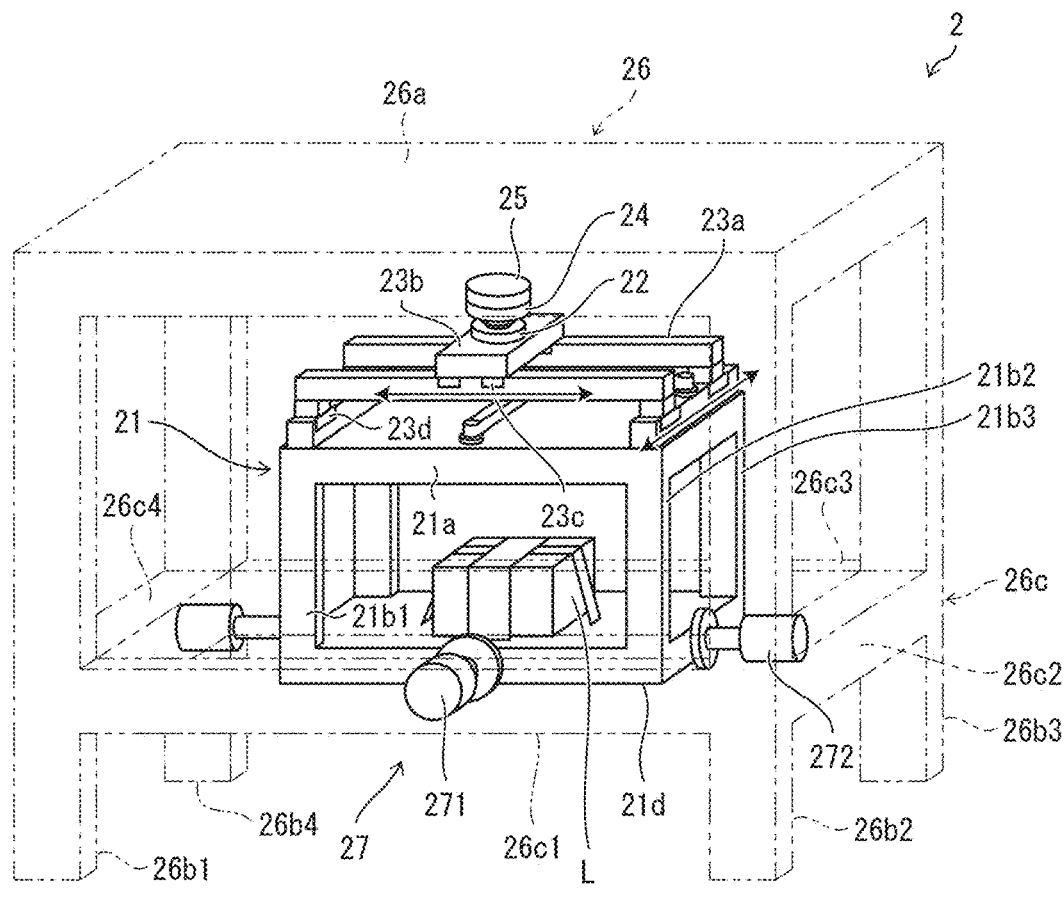
FIG. 4 is a perspective view illustrating a configuration of a pickup system in accordance with Embodiment 2 of the present invention.
Figure 5:
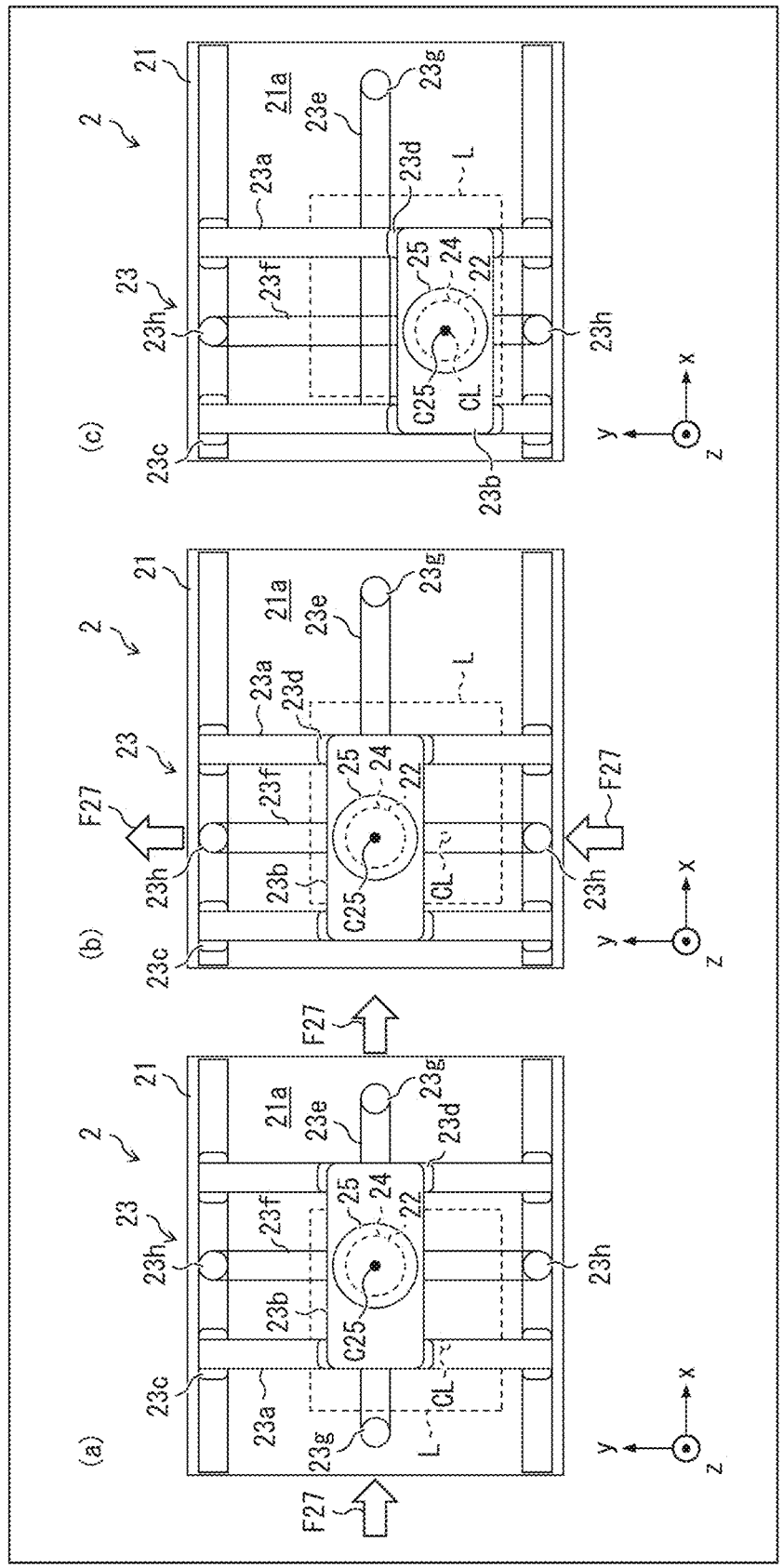
FIG. 5 is a plan view of a holder as seen from above which is provided in the pickup system in accordance with Embodiment 2 of the present invention. (a) to (c) of FIG. 5 each illustrate movement of the holder in a moving step included in a pickup method in accordance with Embodiment 2 of the present invention.

The following description will discuss a pickup system 2 in accordance with Embodiment 2 of the present invention with reference to FIGS. 4 and 5. FIG. 4 is a perspective view of a configuration of the pickup system 2. FIG. 5 is a plan view of a holder 21 seen from above (from a z-axis positive side), the holder 21 being provided in the pickup system 2. (a) to (c) of FIG. 5 each illustrate movement in a moving step S24 included in a pickup method in accordance with Embodiment 2 of the present invention.

The pickup system 2, like the pickup system 1, is a system for causing a drone D (an example of an "unmanned flying object" in the claims) to pick up a load L. As illustrated in FIG. 4, the pickup system 2 includes a holder 21, a connector 22, a moving mechanism 23, a connector 24, a measuring instrument 25, a cage 26, and an actuator group 27. The pickup system 2 also includes a controller (illustration of which is omitted in FIG. 4).

The pickup system 1 in accordance with Embodiment 1 employs a configuration in which the holder 11 is placed on the measuring instrument 14, as illustrated in FIG. 1. On the other hand, in the pickup system 2, the holder 21 is fixed to a top plate 26a of the cage 26 via the connector 22, the connector 24, and the measuring instrument 25, so as to hang from the top plate 26a, as illustrated in FIG. 4. Therefore, in the present embodiment, first, the cage 26 and the actuator group 27 will be discussed, and then, the holder 21, the connector 22, the moving mechanism 23, the connector 24, and the measuring instrument 25 will be discussed.

The cage 26, which is an example of a support, includes the top plate 26a, four columns 26b1, 26b2, 26b3, and 26b4 and a frame 26c. The frame 26c is composed of four beams 26c1, 26c2, 26c3, and 26c4.

The top plate 26a is a plate member which has a rectangular shape when either one of a pair of main surfaces of the top plate 26a is seen in plan view. One of the pair of main surfaces (lower main surface in FIG. 4) of the top plate 26a is provided, in the center of the one main surface, with a placement area on which the connector 24 is to be placed via the measuring instrument 25. The connector 24 and the measuring instrument 25 will be discussed later. The top plate 26a preferably has high rigidity so that even in a case where the weight of the load L is large, deformation such as bending is unlikely to occur. In the present embodiment, a metal plate is used as the top plate 26a.

At respective four corners of the top plate 26a having a rectangular shape, the columns 26b1, 26b2, 26b3, and 26b4 are fixed to the lower main surface of the top plate 26a such that a direction in which the columns 26b1, 26b2, 26b3, and 26b4 extend is orthogonal to the lower main surface. That is, the columns 26b1, 26b2, 26b3, and 26b4 serve as leg parts which support the top plate 26a. The columns 26b1, 26b2, 26b3, and 26b4 have lengths equal to each other. Note that the columns 26b1, 26b2, 26b3, and 26b4 each may be provided, at its lower end, a screw-type adjustment mechanism for adjusting the length of each of the leg parts. The top plate 26a can be fixed such that the placement area described above is substantially horizontal (more preferably, horizontal), by using such an adjustment mechanism.

The frame 26c is provided at intermediate parts of the columns 26b1, 26b2, 26b3, and 26b4. The frame 26c is composed of the beams 26c1, 26c2, 26c3, and 26c4 each of which connects between adjacent columns. The beam 26c1 connects the columns 26b1 and 26b2. The beam 26c2 connects the columns 26b2 and 26b3. The beam 26c3 connects the columns 26b3 and 26b4. The beam 26c4 connects the columns 26b4 and 26b1. The frame 26c configured as above surrounds a bottom plate 21d of the holder 21 in a case where the holder 21 is connected to the connector 24 via the connector 22 and the moving mechanism 23.

The frame 26c is provided with the actuator group 27 which is composed of actuators 271, 272, 273, and 274. The actuator group 27 is an example of the adjustment mechanism. Each of the actuators 271, 272, 273, and 274 is a shaft-like member which linearly extends, and is configured such that an axial length, which is the length along a center axis of each of the actuators 271, 272, 273, and 274, can be adjusted to a desired length. In the present embodiment, each of the actuators 271, 272, 273, and 274 is an air actuator which uses air pressure for adjusting the axial length. Note however that a source of power for use in adjusting the axial length is not limited to air pressure but can be oil pressure or electric power.

The actuator 271 is fixed to a middle point of the beam 26c1 such that the center axis of the actuator 271 is orthogonal to a direction in which the beam 26c1 extends. Similarly, the actuator 272 is fixed to a middle point of the beam 26c2 such that the center axis of the actuator 272 is orthogonal to a direction in which the beam 26c2 extends. Similarly, the actuator 273 is fixed to a middle point of the beam 26c3 such that the center axis of the actuator 273 is orthogonal to a direction in which the beam 26c3 extends. Similarly, the actuator 274 is fixed to a middle point of the beam 26c4 such that the center axis of the actuator 274 is orthogonal to a direction in which the beam 26c4 extends. Each of the actuator 271, 272, 273, and 274 is provided such that a movable tip end portion of the actuator protrudes inward on an inner side of the frame 26c.

The actuator group 27 configured as above can restrict movement of the holder 21 in a y-axis direction and move the holder 21, by controlling the axial lengths of the actuators 271 and 273 which are opposed to each other. Similarly, the actuator group 27 can restrict movement of the holder 21 in an x-axis direction and move the holder 21, by controlling the axial lengths of the actuators 272 and 274 which are opposed to each other. In the present embodiment, the holder 21 is moved within a horizontal plane by using the actuator group 27 so that the center C25 (see FIG. 6) of a six-axis force sensor 25 corresponding to the position of the connector 22 is moved to a position immediately above the position of the center of gravity CL (see FIG. 5) of the holder 21 holding the load L. Note that movement of the actuator group 27 is controlled by the controller discussed later.

Next, the following will discuss the holder 21, the connector 22, the moving mechanism 23, the connector 24, and the measuring instrument 25.

The holder 21 is configured to hold the load L in the same manner as the holder 11. The present embodiment employs, as the holder 21, a holder composed of one top plate 21a, columns 21b1, 21b2, 21b3, and 21b4, and one bottom plate 21d.

The top plate 21a and the bottom plate 21d each have a rectangular shape when seen in plan view. The top plate 21a and the bottom plate 21d have shapes congruent to each other when seen in plan view. In addition, the four columns 21b1 to 21b4 having lengths equal to each other are present between the top plate 21a and the bottom plate 21d. Therefore, the distance between the top plate 21a and the bottom plate 21d is equal to the lengths of the columns 21b1 to 21b4. The columns 21b1 to 21b4 are provided at the respective four corners of the top plate 21a and the bottom plate 21d. The holder 21 configured as described above has a shape of a box which has two pairs of open side surfaces that face each other. In a coordinate system illustrated in FIG. 4, the holder 21 is placed such that the top plate 21a and the bottom plate 21d, each of which have a rectangular shape, have long sides parallel to the x axis, and short sides parallel to the y axis, and such that the direction in which the columns 21b1 to 21b4 extend is parallel to a z axis. Note that the coordinate system illustrated in FIG. 4 is set such that an x-y plane is horizontal and the z axis is parallel to a vertical direction.

In the present embodiment, the load L is fixed to the bottom plate 21d of the holder 21 by using a band-like sling. Alternatively, the load L can be fixed to the bottom plate 21d of the holder 21 by using Velcro (registered trademark). Alternatively, it is possible to use a sling and Velcro in combination in order to fix the load L to the bottom plate 21d of the holder 21. In this manner, the holder 21 holds the load L.

The connector 22 is an example of a first connector and is configured to connect the holder 21 to the drone D in the same manner as the connector 12. The connector 22 is configured in the same manner as the connector 12, and therefore an explanation thereof is omitted here.

The moving mechanism 23 is configured to move the connector 22 within a horizontal plane (the x-y plane) that is a plane which contains axes in a first direction (the x-axis direction) and a second direction (the y-axis direction), in the same manner as the moving mechanism 13. In the present embodiment, the moving mechanism 23 is a moving mechanism which includes a first slider 23a, a second slider 23b, a first guide 23c, a second guide 23d, a first timing belt 23e, a second timing belt 23f, first timing belt pulleys 23g, and second timing belt pulleys 23h.

The first slider 23a and the second slider 23b are configured in the same manner as the first slider 13a and the second slider 13b, respectively. Therefore, in the present embodiment, explanations of the first slider 23a and the second slider 23b are omitted.

The first guide 23c is present between the first slider 23a and a pair of rails provided on the top plate 21a of the holder 21, and serves as a guide which restricts movement of the first slider 23a relative to the pair of rails, to the x-axis direction which is the first direction. In order to restrict the movement of the first slider 23a, the pair of rails extends in parallel to the x-axis direction.

The second guide 23d is present between the first slider 23a and the second slider 23b, and serves as a guide which restricts movement of the second slider 23a relative to the first slider 23a, to the y-axis direction which is the second direction.

The first timing belt 23e and the two first timing belt pulleys 23g are configured to switch a state of the first slider 23a between a slidable state and a non-slidable state. In other words, the first timing belt 23e and the two first timing belt pulleys 23g are an example of a first switch. The two first timing belt pulleys 23g are pulleys provided on a straight line which is parallel to each of the pair of rails and which is at equal distances from the pair of rails. The first timing belt 23e is placed on the two first timing belt pulleys 23g provided as described above, so that the first timing belt 23e extends in a direction parallel to the x-axis direction. At least one of the two first timing belt pulleys 23g is provided with an electromagnetic clutch for switching a state of the pulleys between a rotatable state and a non-rotatable state. This electromagnetic clutch is controlled by the controller. Further, the first timing belt 23e having an annular shape is stretched between the two first timing belt pulleys 23a. A portion of the first slider 23a is fitted to a portion of the first timing belt 23e. Therefore, in a case where the first timing belt pulley 23g is in the rotatable state, the first slider 23a is in the slidable state. On the other hand, in a case where the first timing belt pulley 23g is in the non-rotatable state, the first slider 23a is in the non-slidable state. In this configuration, the first slider 23a is caused to be in the slidable state by turning on the electromagnetic clutch provided in the first timing belt pulley 23g, and the first slider 23a is caused to be in the non-slidable state by turning off the electromagnetic clutch.

The second timing belt 23f and the two second timing belt pulleys 23h are configured to switch a state of the second slider 23b between a slidable state and a non-slidable state. The second timing belt 23f and the two second timing belt pulleys 23h are an example of a second switch. The two second timing belt pulleys 23h are each a pulley provided on each of the pair of rails. The second timing belt 23f is placed on the two second timing belt pulleys 23h provided as described above, so that the second timing belt 23f extends in a direction parallel to the y-axis direction. The second timing belt 23f and the two second timing belt pulleys 23h are configured in the same manner as the first timing belt 23e and the two first timing belt pulleys 23g, except that the second timing belt 23f is stretched not in the x-axis direction but in the y-axis direction. In this configuration, the second slider 23b is caused to be in the slidable state by turning on the electromagnetic clutch provided in the second timing belt pulleys 23h, and the second slider 23b is caused to be in the non-slidable state by turning off the electromagnetic clutch.

As described above, in the present embodiment, in order to switch the state of each of the first slider 23a and the second slider 23b between the slidable state and the non-slidable state, that is, in order to switch the state of each of the first timing belt 23e and the second timing belt 23f between a drivable state and a non-drivable state, the first timing belt pulley 23g and the second timing belt pulley 23h each includes the electromagnetic clutch. Note however that the first timing belt pulley 23g and the second timing belt pulley 23h each may include a mechanical clutch or a mechanical brake in place of the electromagnetic clutch.

The connector 24 is an example of a second connector and is connected to the connector 22. The connector 24 corresponds to the connector 22, and is a second connector. The connector 24 makes a pair of connectors with the connector 22. In the present embodiment, a quick coupling is used as the connectors 22 and 24. Therefore, the connector 22 can be attached to or detached from the connector 24 with a single-touch action. The connector 24 is configured in the same manner as a connector which the drone D is provided with.

The measuring instrument 25 is provided at a portion of the connector 24 on a side opposite to the connector 22. The present embodiment employs a six-axis force sensor as the measuring instrument 25. The six-axis force sensor can detect force and moment along/about three axes of an orthogonal coordinate system. In the pickup system 2, the six-axis force sensor is placed such that among the three axes of the six-axis force sensor, a first axis is parallel to the x axis, a second axis is parallel to the y axis, and a third axis is parallel to the z axis. In other words, the six-axis force sensor is a sensor capable of detecting force Fx in the x-axis direction, force Fy in the y-axis direction, and force Fz in the z-axis direction, and moment Mx about the x axis, moment My about the y axis, and moment Mz about the z axis. Since the present embodiment employs a single six-axis force sensor as the measuring instrument 25, the measuring instrument 25 is also referred to as the six-axis force sensor 25.

The controller (not illustrated in FIG. 4) is configured to measure, on the basis of the sensor signals obtained from the six-axis force sensor 25, the position of the center of gravity CL (see FIG. 6) of the holder 21 holding the load L, with reference to the center C25 (see FIG. 6) of the six-axis force sensor 25 corresponding to the position of the connector 22. The controller is configured to also control the moving mechanism 23 so that the center C25 is located immediately above the position of the center of gravity CL.

The controller moves the center C25 to a position immediately above the position of the center of gravity CL, by moving the connector 22 relative to the holder 21, so that among the three forces Fx, Fy, and Fz and the three moments Mx, My, and Mz, the three moments, which are detected by the six-axis force sensor, are not more than a predetermined value (preferably, so that the three moments are zero). Note that in order to move the connector 22 relative to the holder 21, the controller controls the actuator group 27. The actuator group 27 will be described in detail later.

As illustrated in FIG. 4, the holder 21 is fixed to the top plate 26a of the cage 26, via the connector 22, the connector 24, and the six-axis force sensor 25. The holder 21 is fixed so as to hang from the top plate 26a. Therefore, the moment Mz out of the three moments Mx, My, and Mz is zero, regardless of whether or not the center C25 is located immediately above the position of the center of gravity CL. On the other hand, the moments Mx and My out of the three moments Mx, My, and Mz are respective moments about the x axis and the y axis contained in a horizontal plane. In a case where the center C25 is located immediately above the position of the center of gravity CL, both of the moments Mx and My are zero. On the other hand, in a case where the center C25 is not located immediately above the position of the center of gravity CL, at least one of the moments Mx and My is not zero. Therefore, the controller causes the position of the center of gravity CL and the position of the center C25 coincide with each other, by moving the holder 21, so that both of the moment Mx and the moment My are not more than a predetermined value.

In the present embodiment, the controller (illustration of which is omitted in FIG. 4) is configured in the same manner as the controller 15. In other words, the controller can be realized by hardware provided in an integrated circuit (IC chip) or the like or can be alternatively realized by software, in the same manner as the controller 15. In the latter case, the functions of the controller are each implemented by, for example, a computer (e.g., computer C illustrated in FIG. 3) which executes instructions of a program P that is software.

(Process Flow of Pickup Method)

The following description will discuss a pickup method S2 in accordance with Embodiment 2 of the present invention with reference to FIGS. 5 and 6. FIG. 5 is a plan view of the holder 21 as seen from above (from the z-axis positive side) which is provided in the pickup system 2 as described above. (a) to (c) of FIG. 5 each illustrate movement in the moving step S24 included in the pickup method in accordance with Embodiment 2 of the present invention. FIG. 6 is a flowchart illustrating a process flow of the pickup method in accordance with the present embodiment.

The pickup method S2 is a method for causing, by using the pickup system 2, the drone D to pick up the load L, in the same manner as the pickup method S1. As illustrated in FIG. 6, the pickup method S2 includes a holding step S21, a fixing step S22, a measuring step S23, and the moving step S24. The holding step S21 is a step corresponding to the holding step S11, the measuring step S23 is a step corresponding to the measuring step S12, and the moving step 24 is a step corresponding to the moving step S13.

The holding step S21 is a step of holding the load L by using the above-described holder 21. In the holding step S21, the load L is fixed to the bottom plate 21d of the holder 21 by using, for example, a band-like sling. At this time, the load L is not necessarily fixed such that the center of gravity of the load L coincides with the center of gravity of the holder 21.

The fixing step S22 is a step which is carried out after the holding step S21. The fixing step S22 is a step of fixing the holder 21 where the load L is set, to the top plate 26a of the cage 26 via the connector 22, the connector 24, and the six-axis force sensor 25. (a) of FIG. 5 illustrates a state in which the holder 21 is fixed to the top plate 26a. Note however that in FIG. 5, illustration of the top plate 26a is omitted. In (a) of FIG. 5, the center C25 of the six-axis force sensor 25 is set at the center of the top plate 26a. In this case, the center of the top plate 26a is a reference position, and center C25 corresponds to the center of the connector 22 and the center of the connector 24. The top plate 26a is fixed such that the placement area is substantially horizontal (more preferably, horizontal). Further, the six-axis force sensor 25 is placed so that the placement area is parallel to a plane which contains a first axis (an axis parallel to the x axis) and a second axis (an axis parallel to the y axis) among the three axes along/about which force and moment are to be detected. Therefore, the six-axis force sensor 25 is placed so as to be substantially horizontal to the plane which contains the first axis and the second axis. Further, in (a) of FIG. 5, the center of gravity CL of the holder 21 holding the load L is located in a region on the x-axis positive side and on the y-axis negative side.

The measuring step S23 is a step of measuring, by using the above-described six-axis force sensor 25, the position of the center of gravity CL. Specifically, the controller measures the position of the center of gravity CL, with reference to two moment signals representing three moments Mx and My among sensor signals outputted from the six-axis force sensor 25. The moment Mx is an example of moment about the first axis, and the moment My is an example of moment about the second axis.

The moving step S24 is a step of moving, by using the above-described controller, the center C25 to a position immediately above the position of the center of gravity CL. The controller moves the holder 21 by using the actuator group 27, in accordance with the position of the center of gravity CL which has been measured in the measuring step S23. The arrow F27 shown in (a) of FIG. 5 indicates a direction of force which acts on the holder 21 when the holder 21 is moved toward the y-axis positive side with use of the actuators 272 and 274. The arrow F27 shown in (b) of FIG. 5 indicates a direction of force which acts on the holder 21 when the holder 21 is moved toward the x-axis negative side with use of the actuators 271 and 273.

As described above, the center C25 can be moved to the position immediately above the position of the center of gravity CL, by carrying out the pickup method S2.

Note that the pickup method S2 can be configured to carry out the measuring step S23 again after the moving step S24. The controller measures the position of the center of gravity CL, with reference to three moment signals representing the three moments Mx, My, and Mz. In a case where the three moments Mx, My, and Mz are not more than the predetermined value, the controller should determine that the position of the center C25 is at the position immediately above the center of gravity CL, and end the pickup method S2. On the other hand, in a case where any one of the three moments Mx, My, and Mz is more than the predetermined value, the controller should carry out the moving step S24 again. As described above, the pickup method S2 may be configured to repeatedly carry out the measuring step S23 and the moving step S24 until the three moments Mx, My, and Mz are not more than the predetermined value.

(Effects of Pickup System and Pickup Method)

As described above, the pickup system 2 in accordance with the present embodiment yields the same effect as the pickup system 1. Further, the pickup method S2 in accordance with the present embodiment yields the same effect as the pickup method S1. The following will describe effects which are yielded by the pickup system 2 and the pickup method 2 in addition to the above effects.

The image pickup system 2 further includes: the moving mechanism 23 which includes the first slider 23a and the second slider 23b; the second connector (the connector 24 in the present embodiment); the support 26 provided so that the placement area, on which the second connector (the connector 24) is placed, becomes substantially horizontal; the six-axis force sensor 25; and the actuator group 27. In the pickup system 2, the first connector (the connector 22 in the present embodiment) is fixed to the second slider 23b.

The above configuration makes it possible to realize the pickup system 2 which is simpler than the pickup system 1, since the pickup system 2 can be configured by using the single six-axis force sensor 25.

Further, the pickup system 2 further includes the first switch (in the present embodiment, the first timing belt 23e and the two first timing belt pulleys 23g) and the second switch (in the present embodiment, the second timing belt 23f and the two second timing belt pulleys 23h).

According to the above configuration, after the holder 21 is caused to hold the load L, the first slider 23a and the second slider 23b are set to the slidable state while the position of the connector 22 is being adjusted relative to the position of the center of gravity CL of the holder 21 holding the load L. After this adjustment, the first slider 23a and the second slider 23b can be set to the non-slidable state. This makes it possible to prevent displacement of the connector 22 relative to the position of the center of gravity CL of the holder 21 holding the load L while the drone D is carrying the load L.

Meanwhile, the pickup method S2 further includes the fixing step S22 which is to be carried out after the holding step S21. In the fixing step S22, the six-axis force sensor 25 is placed so that the plane which contains the first axis and the second axis is substantially horizontal, the first axis and the second axis being among the three axes along/about which force and moment are to be detected. Further, in the moving step S24, the connector 22 is moved so that the moment about the first axis and the moment about the second axis are not more than the predetermined value, with reference to a first moment signal indicating the moment about the first axis and a second moment signal about the second axis among the sensor signals outputted from the six-axis force sensor 25.

The above configuration makes it possible to realize the pickup method S2 which is simpler than the pickup method S1, since the pickup method S2 can be configured by using the single six-axis force sensor 25 as the measuring instrument.

(Supplementary Note)

The present invention is not limited to the above embodiments, but can be altered by a skilled person in the art within the scope of the claims. For example, the present invention also encompasses, in its technical scope, any embodiment derived by combining technical means disclosed in differing embodiments.

| Reference Signs List | |
|---|---|
| 1, 2 | Pickup system |
| 11, 21 | Holder |
| 12, 22 | Connector |
| 13, 23 | Moving mechanism |
| 14 | Measuring instrument |
| 14a | Plate |
| 14b | Six-axis force sensor |
| 15 | Controller |
| 24 | Connector |
| 25 | Six-axis force sensor |
| 26 | Support |
| 26a | Top plate (provided with placement area) |
| S1, S2 | Pickup method |
| S11, S21 | Holding step |
| S22 | Fixing step |
| S12, S23 | Measuring step |
| S13, S24 | Moving step |
| D | Drone |
| L | Load |

The invention claimed is:

1. A pickup system comprising:
a holder for holding a load;
a measuring instrument for measuring a position of a center of gravity of the load or the holder holding the load;
a connector being attached to the holder in a movable manner and being for connecting the holder to an unmanned flying object; and
a controller for moving the connector to a position immediately above the position of the center of gravity, wherein
the measuring instrument includes:
a plate on which the load or the holder holding the load is to be placed; and at least one six-axis force sensor which is installed in a manner that supports the plate.

2. The pickup system according to claim 1, wherein the measuring instrument includes four of the six-axis force sensors installed in a manner that supports the plate.

3. The pickup system according to claim 1, further comprising
a moving mechanism for moving the connector,
the moving mechanism including:
  a first slider configured to slide on the holder in a first direction; and
  a second slider configured to slide on the first slider in a second direction intersecting the first direction, the connector being fixed to the second slider.

4. The pickup system according to claim 1, wherein the controller is configured to move the connector to the position immediately above the position of the center of gravity, and then notify the unmanned flying object or a flight control device of a position of the connector, the flight control device being for carrying out flight control of the unmanned flying object.

5. The pickup system according to claim 1, further comprising:
a moving mechanism for moving the connector,
the moving mechanism including:
  a first slider configured to slide on the holder in a first direction; and
  a second slider configured to slide on the first slider in a second direction intersecting the first direction,
  the connector being fixed to the second slider;
a second connector configured to connect to the connector which serves as a first connector;
a support provided so as to make a placement area substantially horizontal, the placement area being an area where the second connector is to be placed;
a six-axis force sensor present between the second connector and the placement area; and
an adjustment mechanism configured to adjust a position of the holder within a plane which contains axes in the first direction and the second direction, in a state in which the second connector is connected to the first connector,
the first connector being fixed to the second slider.

6. The pickup system according to claim 5, further comprising:
a first switch configured to switch a state of the first slider between a slidable state and a non-slidable state; and
a second switch configured to switch a state of the second slider between a slidable state and a non-slidable state.

7. A pickup method comprising the steps of:
holding a load by using a holder;
fixing the holder to a support via a connector and a six-axis force sensor,
measuring, by using a measuring instrument, a position of a center of gravity of the load or the holder holding the load; and
moving, by using a controller, a connector to a position immediately above the position of the center of gravity, the connector being provided on the holder and being for connecting the holder to an unmanned flying object, wherein
the step of fixing, the six-axis force sensor being placed such that a plane which contains a first axis and a second axis is substantially horizontal, the first axis and the second axis being among three axes along which force is to be detected and about which moment is to be detected, and
in the step of moving, the connector being moved so that the moment about the first axis and the moment about the second axis are not more than a predetermined value, with reference to a first moment signal indicating the moment about the first axis and a second moment signal about the second axis among sensor signals outputted from the six-axis force sensor.

* * * * *